UNITED STATES PATENT OFFICE.

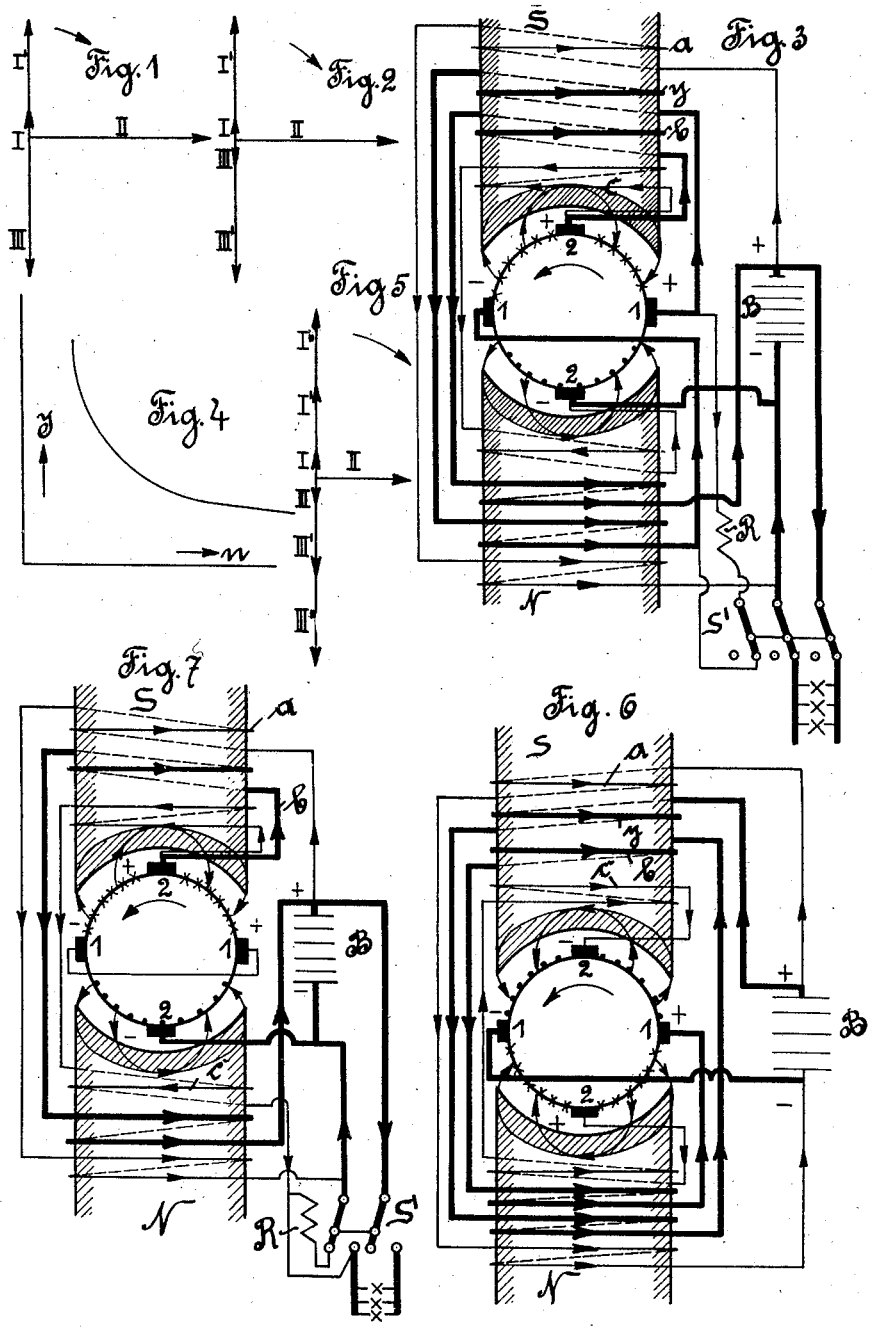

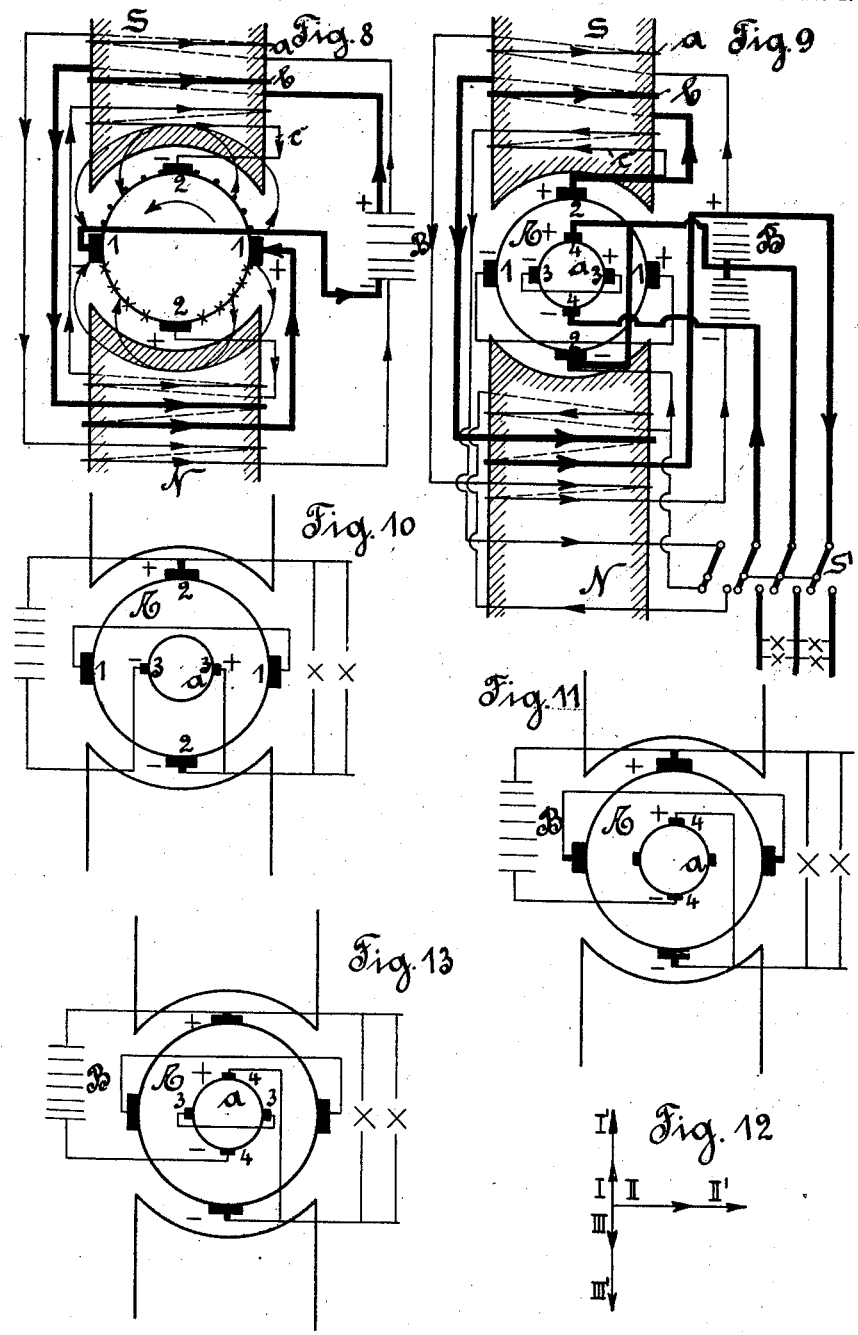

HANS CHARLET, OF KREFELD, GERMANY.

INHERENTLY-REGULATED DIRECT-CURRENT DYNAMO.

1,416,265.      Specification of Letters Patent.     Patented May 16, 1922.

Application filed July 8, 1920, Serial No. 394,849. Renewed March 29, 1922. Serial No. 547,906.

*To all whom it may concern:*

Be it known that I, HANS CHARLET, a citizen of the German Republic, and resident of 23 Spinnereistrasse, Krefeld, Germany, have invented certain new and useful Improvements in Inherently-Regulated Direct-Current Dynamos, (for which I have filed applications in Germany March 30, 1918, April 20, 1918, June 24, 1918, August 9, 1919,) of which the following is a specification.

It has already been suggested to employ on motor cars and similar vehicles a single direct current machine both for producing the light current and for starting the gasolene engine, the primary field being, when the said machine is employed as transverse field generator weakened by means of additional exciting windings through which a short circuit current flows. The same effect may, now, be obtained in a more perfect manner if, according to the present invention the secondary current is employed for strengthening the primary field.

In a normal transverse field machine a small primary field produces a current in the armature winding short circuited over the brushes in the neutral zone. This current (secondary current) produces a transverse field (secondary field), which, as is known, leads by 90° in advance of the primary field. When a working current is to be derived from such a machine, the primary field will, from the very first, have to be strengthened by an amount corresponding to the armature reaction originating from the tertiary field. This tertiary field leads ahead of the secondary field by 90°, thus by 180° ahead of the primary field and therefore acts contrary to the latter. Fig. 1 is the known field diagram of a machine of this kind. In this figure arrow I is the original primary field, which produces the secondary field II and arrow III is the tertiary field of the armature which is compensated by arrow I' in the direction of the primary field. As will be evident from the diagram, and is also well known, such a machine may be shortcircuited without danger, but may not be allowed to run idle, as in the latter case the tertiary field III of the armature will be omitted and not only the quantity I of the primary field, but also that of I' will come into effect for producing the secondary field. The potential will therefore, in case the machine runs idle, reach a dangerous figure.

Given a transverse field machine, excited from an outward source to such an extent that the primary field I amounts to say 10% of the normal tertiary field, Fig. 2. This primary field will produce a secondary current in the armature winding shortcircuited over the brushes 1—1 (Fig. 3). This current will not flow, as in a normal transverse field machine from brush to brush, but through the winding $y$ on the field magnet poles in such a manner, that the field I' produced by this winding will reinforce the original primary field I so that a certain current may be derived from the brushes 2—2.

To these brushes 2—2 a further winding $c$ disposed on the field magnet poles is connected in such a manner that the field III' produced by this winding acts contrary to the arrow I' of the primary field. This counter winding will therefore serve as a perfect substitute for a tertiary field, which is produced by a current flowing at a corresponding strength through the armature.

The current flowing in the counter winding $c$ will produce in the armature the small tertiary field III (Fig. 2) which likewise acts contrary to the field I'. The field III' produced by the counter winding $c$ does not need to completely compensate the field I', it is sufficient if it compensates only 90% thereof, whilst the remaining 10% are compensated by the tertiary field III.

Fig. 3 illustrates the path of the current in a machine thus compensated. The outward excitation, coming from the battery, produces in the winding $a$ the original primary field I in such a manner, that a north pole N is created below, and a south pole S above. This primary field produces in the armature the secondary current over the brushes 1—1, which, with the supposed left hand rotation flows off away from the observer beneath the south pole, but towards the observant beneath the north pole. The current of the two brushes 1—1 is, according to the present invention (Fig. 3) utilized, as hereinbefore stated, to reinforce, by flowing through the winding $y$, the primary field I by the amount I'. Proceeding from the right hand positive brush this current will, through the winding $y$ produce, exactly the same as the outward excitation $a$, a south pole above and a north pole below. As is further evident from Fig. 3 this secondary current flowing through the armature winding will produce the secondary field II, which emerges at the left armature half and flows transversely to the primary field through the pole shoes, entering again on the right side of the armature.

Within the neutral zone of this transverse field (secondary field) the brushes 2—2, disposed beneath the field magnet poles are arranged, from which the working current may be derived.

To the said brushes 2—2 the counter winding $c$ mentioned, placed on the magnet poles is connected, which produces the field III' acting opposedly to the primary field I', whereas the tertiary field III is produced by the armature winding itself under influence of the current likewise flowing through the said counter winding $c$.

The inner processes in such a machine are, at a given number of revolutions, as follows: By the tertiary field III produced in the armature by the current flowing through the counter winding $c$ and the said counter winding $c$ itself the part I' of the primary field produced by the winding $y$ is completely compensated. The potential at these brushes is only determined by the size of the primary field I and the secondary field II (Fig. 2) produced thereby. Assuming that this primary field I amounts to 10% of the tertiary field produced by the normal working current. If, now the speed of the machine is increased at will, the potential at the brushes 2—2 would tend to rise in proportion with the speed. When the potential will have risen by only 5%, in consequence thereof also the counter action of the winding $c$ and field III' will have risen by 5%. But not only the counter effect of field III' will rise by 5%, also that of the tertiary field III would rise by the same amount, as the same current, which flows from the brushes 2—2, also flows through the armature winding. At a rise of the potential of 5%, the counter effect of the two fields III+III' will also have risen 5%. The original primary field will therefore have been compensated by one half, so that the secondary field could no longer be maintained at its full strength.

The secondary current, however, which flows between the brushes 1—1 and is employed, according to the present invention for producing the field I', does with a rising speed, not proceed along a straight line, but, as known and shown in Fig. 4, approximately along a hyperbola, so that with an increasing speed $n$ the current J decreases. With an increasing speed therefore not only the counter effect of the fields III+III' will rise, but also the winding $y$ through which this secondary current flows, and which produces the field I' in the direction of the primary field I, will be reduced in its effect by one half. The consequence is that the primary fields I+I' will not be compensated by the counter winding, but increase in potential with 5% already at a much smaller increase in potential.

If, on the contrary, the start is made with the normal speed, and this is then reduced, the field I' would, with decreasing speed, act in the sense of a powerful strengthening of the primary field I, as the intensity of the current in the secondary field increases with a decrease in speed so that the potential will retain its value constant even up to a speed which is to a certain extent below the normal. At a suitable size of the winding $y$ it is possible to reduce the counter action of the fields III+III' to a minimum, and it is besides possible to give, by a suitable relation of the windings $y$ and $c$, the machine any desired characteristic potential, either a perfect constancy of potential from a given speed upwards, or a potential rising and falling with the speed.

In order to derive a service current from the machine it is only necessary to provide a main current winding $b$ on the poles, Fig. 3, through which all or a part of a service current flows, and which will increase the primary field by an amount I'', Fig. 5, which is exactly as great as the tertiary field III'' counteracting this field, and produced by the same service current in the armature winding.

When the two fields I'' and III'' are equal, there will be no outward effect on the brushes 2—2. It is however possible, that with an increase of the load, the potential may rise, or vice versa. It will in such case only be necessary to either let the effect of field III'' be somewhat greater than that of field I'', or vice versa. Also it is quite in the power of the operator, to give the machine any desired characteristic. After the inner magnetic relations have been determined, the machine will regulate automatically without any outward manipulation. Fig. 3 illustrates the flow of the current when the machine is employed as a generator.

If, now, the machine is desired to work as a motor for cranking up the petrol engine, the connections as shown in Fig. 6 will have to be made by aid of a special switch. The winding $a$ producing the original primary field I remains as it is. Likewise the winding $c$ proceeding from the brushes 2—2, which, when the machine was running as a generator, produced the counterfield III', remains, because, as the current has changed its direction, the transverse field will naturally, also have reversed its direction, as will be evident from the diagram of lines of force shown in Fig. 6. The consequence is that the current derived from these brushes changes its direction correspondingly, and will flow through the winding c no more as field weakening but as field strengthening.

The winding y, which with the generator, was traversed by a secondary current (short-circuit current) and produced the primary field I', will, be connected, either alone, or with the winding b producing the primary field I' in series or parallel, so that each winding by itself, or both jointly will be traversed by motor current in a field strengthening sense. Thus all 4 windings have been utilized for producing a field as strong as possible, so as to obtain as great a torque as possible. Naturally it is not necessary to leave the counterwinding at the brushes 2—2, and it may be obviously connected in a proper manner to the brushes 1—1.

When, now, such a machine is to be used for train illuminating purposes, so that it yields a current of constant polarity at a changing sense of rotation, it is only necessary to shortcircuit the brushes 1—1 as shown in Fig. 7, directly, and not over the winding as in Fig. 3. The primary field I is then increased by a greater value I', by the constant excitation being correspondingly increased. Furthermore an additional exciting winding c, Fig. 7, is connected, the same as in the arrangement according to Fig. 3, to the poles, said winding being connected to the service brushes lying within the neutral zone of the secondary field, and acting contrary to the field I+I', being so dimensioned, that the field III' Fig. 2, produced by it, combined with the reaction III of the current of winding c flowing in the armature winding over the service brushes will, at a given speed, just compensate the additional field I'. With such a machine the potential at the service brushes will, when the machine is running idle, at a varying speed, remain practically constant, if the ratio of field I to the additional field I' has been chosen sufficiently large. On the one hand, the potential produced in the secondary field by the rotation of the armature will with an increasing speed, likewise increase. On the other hand, however, the current flowing in the armature winding over the service brushes 2—2 and in the additional exciting winding c will thereby be increased, and the primary field I and with it also the secondary field II will be weakened. By suitably dimensioning the various excitations the potential at the service brushes may remain constant with an increasing speed, or rise and fall therewith. If, for example, Fig. 2, the primary field, necessary for exciting the secondary field, amounts to 10% of the fields III+III', which are produced by the current flowing through the additional exciting winding c, the potential at the brushes 2—2 would, in case the current flows between the short-circuited brushes 1—1 in a straight line, at a doubling of the speed, rise by 5% only, because the current flowing in the additional exciting winding c would rise by 5%. Therefore only about 0.5 I would remain effective of the primary field I, and thus also the secondary field II would drop to half its power. The current flowing between the short-circuited brushes 191, flows approximately in a hyperbola, as indicated in Figure 4.

For deriving a current for work from such a machine, it is only necessary to provide a main current winding b, Fig. 7, through which such current flows in the manner described.

Even if the sense of rotation of the machine is reversed, the current will still flow in the same direction as the secondary current is reversed as well as the rotation. Such a machine may therefore also be used with advantage for illuminating trains and vehicles. It may, however, by simply switching over certain winding connections, be converted into a motor so that, when used on motor cars, it may be utilized both as a dynamo for lighting and the like purposes, and as a motor for cranking up the petrol engine. When the machine is to be used as a motor, the shortcircuiting of the pair of brushes 1—1 must be cancelled by turning a switch, and the main current winding of the machine must be connected to the brushes 1—1 in the neutral zone in such a manner, that the motor current produced enters the armature at the positive brush and magnetizes the magnet poles N—S in the sense of the original primary field. Fig. 8 shows the connections for motor work, the arrows indicating the direction of the flow of the current in the windings. It may be seen therefrom, that the current reverses its direction in the armature. In consequence thereof also the current, which may be derived from the brushes 2—2 lying beneath the field magnet poles, also reverses its direction and flows, as hereinbefore stated, now through the additional exciting winding c no more in a sense weakening the primary field, as with the dynamo according to Figs. 3 and 7, but strengthening the same (Figs. 6 and 8) so that here the transverse field may be utilized for further useful work and all three windings may be employed for producing a field as powerful as possible, so as to make the pulling moment as great as possible when the machine is employed as motor. Of course the additional exciting winding c may, when the machine is being used as a motor, be cut out together with the main current winding b from the brushes 2—2 and be accordingly switched on to the brushes 1—1 into the neutral zone of the primary field, so that the original field is increased as much as possible by the two windings. The said case, that both windings have to be switched off from the brushes 2—2 and on to the brushes 1—1 may occur when an exact given number of revolutions in the cranking up motor is required for securing ignition in the petrol engine. In this case it may even be necessary to entirely cut out the winding $c$, so that it is not utilized for strengthening the field.

The main current winding may for use as generator also here be given the same dimensions as in the hereinbefore described arrangement, so that field I' and III' are equal or one exceeds the other, so as to have a rising or falling potential with an increasing load. In the same manner the characteristic referred to the speed may be influenced. If the counterfield III' (Fig. 2) produced by the winding $c$ (Fig. 7) is made smaller than assumed in the example, for example thus that the primary field I is 30% of III+III', the potential will rise with an increasing speed, whilst, on the other hand, if III' is made correspondingly larger a potential may be obtained which will drop with the speed. By suitably dimensioning the windings it is therefore possible to give the machine any desired characteristic.

In charging storage batteries, however, the employment of a main current winding has with machines of known types been carefully avoided, because of a possible back current. The machine according to the present invention is quite proof against such back current. If, with a connection as dynamo (Figs. 3-7) the moment has arrived, at which the battery is fully charged and has risen to the same potential as the dynamo, and therefore there is no current flowing from the dynamo to the battery in a charging sense, the moment has arrived when the dynamo runs idle. The conditions are exactly the same as they have already been described for this condition. If, now, a current were to flow in the reversed direction from the battery to the dynamo, this current would indeed weaken the primary field, but as the current will now also flow in the armature in the reverse direction, the tertiary field produced would now not cause any weakening of the primary field, but on the contrary strengthen the same to the same extent as it is weakened by the current flowing in the opposite direction in the main current winding. That is to say, the primary field necessary for maintaining the secondary field has kept exactly its former power, and with it the therefrom resulting potential at the brushes of the transverse field 2—2. A machine of this type need therefore, when running normally as a dynamo, not be protected against back current, it being as proof against such back current as against a decrease on an increase of the load or a change in the speed.

A machine excited according to Fig. 9 is excellently suited for lighting a train at a constant potential. The battery B, required for lighting the train when standing must be charged while the train is running, so that at the next stop, it may take over the lighting of the train in a reliable manner. For this purpose it is necessary in many instances, to dispose of an additional potential, beside and independent of the normal working potential of the dynamo, so as to allow of a rapid and certain recharging of the battery.

The present invention obtains this object by a second winding with a smaller number of wires and a second collector "$a$" being provided on the existing armature A (Fig. 9). Then potential may be derived from this collector at two points. Once at the pair of brushes 3—3, which is disposed in the same plane with the brushes 1—1. The potential at these brushes, which are thus in the neutral zone of the primary field, is entirely determined by the latter. As the primary field is comparatively small, the potential at these brushes will, correspondingly be small only, as the required additional potential, as compared to the main potential at the brushes 2—2 need only be small. With an increasing speed, however, the potential will rise with the same in proportion, if the primary field really remained constant. The power of this primary field, however, will with an increasing speed, be influenced by the counteraction of the counter winding $c$, so that there will be no absolute proportionality between speed and potential. Connected in series with the brushes 2—2, there would therefore be a constant portion of the potential, namely at the brushes 2—2, and a portion at the brushes 3—3 rising with the increasing speed, this latter portion being utilizable for the differential charging of the battery, Fig. 10. When the train is running slowly, the charging up will be small, at a faster speed of the train the greater.

The potential at the brushes 4—4, Fig. 9, shows a different behaviour. Also these brushes are, the same as the main brushes 2—2 in the neutral zone of the secondary field II. Neither does this secondary field have a constant power, as it sinks with the shortcircuit current flowing between the brushes 1—1 which drops with an increasing speed approximately along a hyperbola. As there is a fixed ratio between the number of wires of the main armature A and of the additional armature $a$, the logical consequence is that the two individual potentials will also be at a fixed ratio to each other and independently of the speed, each individual potential will maintain its constant power. If the potentials of both armatures are properly connected in series, it will, therefore be possible (Fig 11) to supply the lamps as well as the storage battery with different potentials, and independently of each other.

A third possibility consists therein that the brushes 3—3 of armature $a$ (Figs. 9 and 13) and the brushes 1—1 of the main armature A are shortcircuited. Thereby, in exactly the same manner as hereinbefore described, a second secondary field II' would be produced orginating from the primary main field I, said second secondary field II' covering the first would increase the latter to the power II+II' (Fig. 12). It is thereby, however, not possible for the potential at the brushes 2—2 to rise, because the counter-action of the counterwinding $c$, or of the fields III+III' would also in this case result in a complete compensation of the primary field I, and therefore also both secondary fields II+II' would be cancelled. On the other hand, with a decreasing speed, the secondary field II' would support the original secondary field II effectively in maintaining the potential at the brushes 2—2 constant, even when the speed has sunk far below the normal figure. For compensating the tertiary field which is produced by the battery charging current flowing through the winding of armature $a$, it is only necessary to provide, the same as with the main armature, a further main current winding, which will accordingly compensate this new tertiary field III''.

For yielding a constant potential, a transverse field machine, need not only be excited according to the diagram given in Figs. 7 and 9, but may also be excited according to the diagram referring to the present invention shown in Fig. 3. In all instances, in which, according to the present invention, a constant potential, or a potential falling or rising with the speed is obtained at the service brushes of the one armature winding, the potential at the service brushes of the other armature winding will show the same behaviour, that is to say, likewise be either constant, or rise or fall with the speed. Machines of the hereinbefore described kind work without any outward regulation, if the field and armature A—W influencing each other are maintained, unvaryingly at a given potential. It may now occur, that during operation a different potential of the same characteristic is desired. This will, for example, be the case, when the machine according to Fig. 7 shall recharge the required battery. The counter excitation may be weakened by switching in or parallel a resistance, or by cutting out a part of the counter exciting winding, so that the part I' of the entire primary field I+I' is not completely compensated, and a greater portion I remains for forming the transverse field II, or vice versa, reinforcing the primary field I+I' alone and leaving the counter excitation unchanged, whereby the part I' is compensated, as before, whilst part I increases. The transverse field will, in consequence of this increase of part I of the entire primary field I+I' assume a higher value and therefore the potential at the service brushes will increase by such amount, until the equilibrium of the fields is again reached.

Accordingly as the fields have been chosen, the increased potential existing at the service brushes will behave when the counter exciting field is weakened or the primary field is increased, and thus either remain constant with an increasing speed, or drop or rise. It is furthermore possible to give the machine at a changed potential any desired characteristic of potential.

In Fig. 7 R is a resistance, which, for weakening $c$ is connected by means of switch S', for example, in series with $c$.

The switch S' is so arranged, that by it the supply net is cut off, when, by throwing in the resistance R it weakens the counter excitation $c$, and thereby the potential at the service brushes 2—2 rises, for charging the battery with this increased potential.

The resistance R may, obviously, also be switched in in two stages, for example, for feeding the battery at the first stage with the normal charging potential, and at the second stage with an increased charging potential for overcharging.

As already stated, it is also not necessary, to weaken the counter excitation $c$, on the contrary the primary field I+I' may be increased to a certain degree by increasing the primary winding $a$. Such increase may, naturally, also be made in several stages according to the purpose to be obtained. For varying the potential at the service brushes 2—2 it is only necessary to vary by some means or other the part I of the primary field, whereas part I' remains compensated by the counteraction of the excitation $c$ in accordance with the desired characteristic of potential.

In Fig. 3, for example, a strengthening of the field I of the entire primary fields I+I' is obtained by a resistance R lying parallel to the additional exciting winding $y$ and being wholly or partly cut out by means of switch S', when an increase of potential is required. The resistance may normally also be in series with $y$, and be short-circuited when the potential is raised. Also here, naturally, the varying of the primary field may be obtained either by increasing the primary winding $a$, or weakening the counter exciting winding $c$, or, altogether, by varying the effect of one of the three windings $a-y-c$, or of one winding in combination with one or both of the others together.

The same is the case with regard to the description of Fig. 9. Also here it may occur, that when two windings are employed on the armature and this arrangement is used connected in series, for feeding a three wire system, a battery is employed, which must be charged at a correspondingly higher potential.

The switch $S'$, for example, here cuts out a part of the counter excitation $c$ whereby the part I of the entire primary field $I+I'$ is correspondingly increased.

Of course, the potential at the service brushes of the machine may be reduced by the same method, by the part I of the entire primary field $I+I'$ being weakened by the same means.

The main current winding required for compensating the tertiary field of the armature remains unaffected by the procedure, as it serves only for compensating the tertiary field III.

I claim:

1. An inherently regulated direct current dynamo, adapted to be used at will as either a generator or as a motor, embodying a constantly excited field with main current winding and additional exciting windings, brushes, one set being located in the neutral zone of the primary field, the other set of said brushes being in the neutral zone of the secondary field, the primary field required for producing the working current being produced by the main current winding.

2. A structure according to claim 1, wherein the set of brushes in the neutral zone of the secondary field is disposed beneath field magnet poles.

3. A structure according to claim 1, wherein the set of brushes in the neutral zone of the secondary field is disposed beneath field magnet poles, and means for reinforcing the original primary field.

4. A structure according to claim 1, wherein the set of brushes in the neutral zone of the secondary field is disposed beneath field magnet poles, and means adapted to serve as a substitute for a tertiary field of the armature.

5. A structure according to claim 1, wherein the set of brushes in the neutral zone of the secondary field is disposed beneath field magnet poles, the counter winding, and means whereby the tertiary field is produced by the armature winding itself under influence of the current flowing through the counter winding.

6. A structure according to claim 1, wherein the set of brushes in the neutral zone of the secondary field is disposed beneath field magnet poles, and a counter winding placed on the magnet poles.

7. A structure according to claim 1, wherein the set of brushes in the neutral zone of the secondary field is disposed beneath field magnet poles, a counter winding placed on the magnet poles, and means for increasing the primary field.

In testimony whereof I affix my signature in the presence of two witnesses.

HANS CHARLET.

Witnesses:
 M. ENGEL,
 GUY BAUER.